United States Patent [19]

Stallard et al.

[11] Patent Number: 4,995,100
[45] Date of Patent: Feb. 19, 1991

[54] AMPLICATION OF OPTICAL SIGNALS

[75] Inventors: William A. Stallard, Colchester; Andrew D. Ellis; Derek Malyon, both of Ipswich, all of England

[73] Assignee: British Telecommunications public limited company, United Kingdom

[21] Appl. No.: 318,221

[22] Filed: Mar. 2, 1989

[30] Foreign Application Priority Data

Mar. 4, 1988 [GB] United Kingdom ............... 8805204
Jul. 29, 1988 [GB] United Kingdom ............... 8818107

[51] Int. Cl.$^5$ .............................................. G02F 1/00
[52] U.S. Cl. ................................. 455/606; 455/609; 455/611; 330/4.3
[58] Field of Search ................. 455/606–611, 455/600, 619, 603, 40; 340/870.28; 330/4.3; 367/131–134

[56] References Cited

U.S. PATENT DOCUMENTS

| | | | |
|---|---|---|---|
| 4,499,610 | 2/1985 | Miltonberger | 455/619 |
| 4,574,249 | 3/1986 | Williams | 455/619 |
| 4,688,268 | 8/1987 | Holland | 455/619 |
| 4,859,015 | 8/1989 | Krinksky et al. | 455/619 |

FOREIGN PATENT DOCUMENTS 2524230 9/1983 France .
2025121 1/1980 United Kingdom .

OTHER PUBLICATIONS

Patent Abstracts of Japan, vol. 11, No. 113 (E-497)[2560], 9th Apr. 1987, and JP-A-61 262 327 (Mitsubishi Electric Corp.).
Patents Abstract of Japan, vol. 8, No. 198 (E-265)[1635], 11 Sep. 1984; & JP-A-59 86 930 (Fujitsu K. K.).

Primary Examiner—Donnie L. Grosland
Attorney, Agent, or Firm—Nixon & Vanderhye

[57] ABSTRACT

An AGC for a laser amplifier uses a control tone modulated onto the optical signals. During use the modulation on the optical signals is superimposed on the drive current for the laser. The AGC derives a control signal by detecting the modulation in the drive current, multiplying it by the drive current. The drive current for the laser is adjusted to keep the control signal constant. In a preferred embodiment a low level sensor detects when the control tone falls below a threshold level and switches the circuit to a default configuration. The default configuration provides a distress signal to indicate a fault and to identify the affected amplifier. This preferred embodiment is particularly suitable for submarine telecommunications capable which include a plurality of inaccessible amplifiers.

10 Claims, 2 Drawing Sheets

AMPLICATION OF OPTICAL SIGNALS

This invention relates to the amplification of optical signals and in particular it relates to an automatic gain control which is adapted to control the gain of a semiconductor optical amplifier in such a manner that the optical power of the amplifier's output is substantially constant. (A semiconductor amplifier can be regarded as a laser with reflection minimised, i.e. a laser with the reflecting system suppressed as much as possible).

Semiconductor amplifiers have many actual or proposed applications. One such application is for telecommunications. Optical fibres have an attenuation of about 0.2 to 0.3 dB/km and, therefore, the range without signal processing is limited. Signal processing using optical amplifiers is attractive by reason of simplicity and amplifiers with gains of about 10 to 30 dB are available so that such systems require an amplifier every 50 to 150 km. Up to about 10 amplifiers can be used in series before the total distortion becomes unacceptable, i.e. a total distance of 500 to 1500 km. For longer ranges more complicated equipment, involving signal re-shaping, signal re-timing and possibly error correction are needed.

It is well known that the ambient temperature affects the gain of an optical amplifier. Thus land based equipment is affected by the seasons and submarine equipment is affected by the temperature of the sea.

EXAMPLES OF SPECIFIC EFFECTS INCLUDE

(1) Amplifier performance

The gain falls off with rising temperature. This is the major effect. It probably accounts for about half of the variation.

(2) Refractive index

The refractive index of the amplifier, i.e. the refractive index of the semiconductor from which the amplifier is made, varies with temperature. Since the amplifier is designed to give optimum performance at a design wavelength and the wavelength of light is affected by the refractive index, the performance is affected by temperature.

(3) Polarisation

The amplifier has different gains for different polarisations of light. The polarisation is affected by the fibre and the effect is likely to be temperature dependent. Hence the gain is affected by the temperature of the surroundings, e.g. the temperature of the sea in the case of a submarine system.

Thus the performance, and hence the optical power output, of an optical amplifier depends on extraneous factors. It is an object of this invention to reduce the power variations which result from these performance variations.

It has been proposed to adopt control techniques in which the output power is measured directly. However, these measurements are difficult to perform.

The control technique utilised by this invention comprises applying a low frequency control tone onto the optical signals at their point of first generation.

Optical amplifiers are powered by a drive current and, because an amplifier is similar to a detector, the modulation on the optical carrier can be detected as a modulation of the bias current and/or voltage of the device. In particular the control tone can be detected as a ripple having the same frequency as the control tone superimposed on the steady state bias current and/or voltage. Variations in this ripple indicate variations in the performance of the system.

According to this invention an automatic gain control (AGC) circuit measures this ripple and thereby obtains a control parameter. The AGC adjusts the drive current so as to keep the control parameter constant, e.g. by comparing it with a preset value. The amplitude of the oscillation (or a value equivalent thereto, e.g. its RMS value) is a convenient control parameter. Preferably the AGC multiplies the amplitude of the oscillation (or its equivalent) by the value of the steady state drive current to obtain the control parameter.

At the final destination, e.g. where the optical signals are demodulated, the control tone is conveniently removed, e.g. by filtering, before demodulation.

As stated above, the AGC according to the invention relies on a control tone which is modulated onto the signals. The amplitude of the control tone should be small, e.g. 0.1% to 10% (preferably 1 to 5%), compared with that of the signals. Also the frequency of the control tone should be much lower, e.g. more than 100 times lower and preferably more than 10,000 times lower. In most optical systems the bit rate is usually above 1 megabit per second and often above 1 gigabit per second. In this case frequencies of 0.1 kHz–100 kHz are suitable for the control tone.

It will be appreciated that the very large difference in frequency between the control tone and the data facilitates their separation. Thus the control tone can be excluded from data handling devices such as demodulators and the demodulator may not be capable of responding at the low frequency of the control tone. Similarly the data can be excluded from the AGC circuits.

The AGC circuits of the invention are particularly suitable for controlling optical amplifier telecommunications systems, especially for submerged amplifiers in submarine optical telecommunications systems.

In addition to the normal configuration described above an amplifier according to the invention preferably includes a default configuration which is adopted when the level of control tone falls below a threshold level, e.g. drops to zero when a cable is accidentally broken. The distress configuration provides one or more of the following functions:

(1) It provides a distress signal to indicate that the default configuration has been adopted. This usually indicates a broken cable or a failed amplifier.
(2) It provides an alternate mode of operation (without AGC). This enables a cable to transmit the distress signal mentioned in (1).
(3) It safeguards the AGC loop against overload when there is no control tone.

The invention will now be described by way of example with reference to the accompanying drawings in which.

Figure 1:
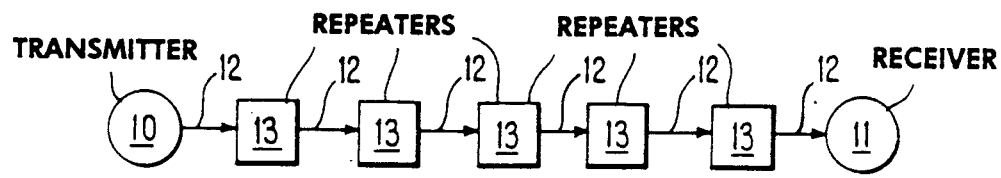
FIG. 1 illustrates a single fibre of an optical submarine telecommunications system including five optical amplifiers each with an AGC according to the invention.

As shown in FIG. 1, the system comprises a transmitter 10 which sends optical signals modulated with data to a receiver 11 via six optical cables 12 linked by five repeaters 13. The distance between the repeaters 13 is 60 km. (Shorter stages, e.g. 50 km, can clearly be used but ranges above 100 km are unlikely to give adequate performance.) Thus the total length of this system is 360 km.

Systems which limit signal processing to simple amplification are limited to about 12 repeaters which gives a maximum range of about 1000 km. Nevertheless there are requirements for submarine links of up to 1000 km and these simple systems are of great interest.

In specifying such systems it is desirable to specify an optical power output for each repeater. Each stage is designed to give its optimum performance when operating under specific conditions. However, the operating conditions of the system may vary considerably, e.g. performance is temperature dependent and hence affected by the temperature of the sea. Thus the performance may sometimes be degraded because the output power of the amplifier does not always conform to system specification.

The amplifiers according to the invention include AGC circuits to keep the power close to the specified value. These AGC circuits make use of a control tone which is modulated onto the carrier beam as well as the data.

The transmitter 10 includes a 10 kHz crystal oscillator (not shown). The tone generated by the oscillator is added to the drive current for the laser. The tone may be applied to data '1's and/or data '0's. In this example it was applied to both.

The control tone applied at the transmitter 10 is received at and used by all the AGC circuits in all the repeaters 13. The carrier tone is also received at the receiver 11 but the control tone is filtered out so that the demodulation to recover the data is not adversely affected.

Figure 2:
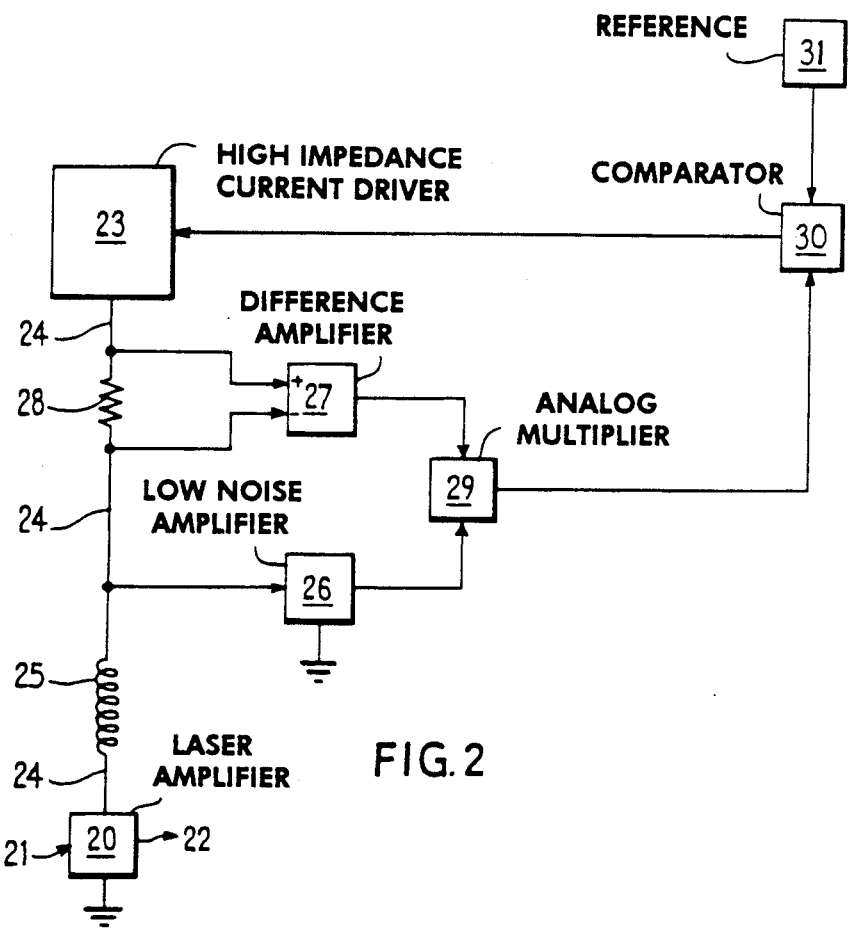
FIG. 2 illustrates, as a block diagram, an amplifier for use in the system of FIG. 1.

The important features of the signals in this example are:
Bit Rate 200M Bits/sec
Control Tone Frequency 10 kHz
Bit Period 5 ns
Control Tone Period 100?s
Control Tone Period:Bit Period $2 \times 10^5$
Signal:Control Tone Ratio 15 dB An AGC circuit is shown in FIG. 2. The circuit controls a laser amplifier 20 which has an input facet 21 and an output facet 22. In use these facets are associated with input and output fibres. The laser amplifier 20 is powered by a drive current supplied by a high impedence current device 23 via line 24 which contains an inductor 25 to prevent high frequency signals from laser 20 affecting the device 23. Within the working range, the log(power) at the output facet 22 of the laser is proportional to the drive current in line 24. The laser amplifier 20 is associated with an AGC circuit which keeps the power at facet 22 constant by adjusting the drive current in line 24.

The AGC circuit comprises low noise amplifier 26 which produces an output proportional to the amplitude of the control tone and a difference amplifier 27 which is connected in parallel with resistor 28 located in line 24 so that it produces an output proportional to the current in resistor 28, i.e. the drive current for laser amplifier 20. The outputs from devices 26 and 27 are fed to analogue multiplier 29. A comparitor 30 is connected to compare the output of multiplier 30 with a reference 31 and to adjust device 23 in accordance with the comparison. (The response is preferably averaged over a period of about 2 seconds to remove short term fluctuations). The operation of the AGC circuit will now be described. Digital processing could be used instead of the analogue devises shown.

During use, optical signals are received at input facet 21, amplified in laser amplifier 20 which provides an output at output facet 22. Laser amplifier 10 incidentally causes the modulation of the optical signals to appear in line 24, i.e. a ripple is imposed on the steady state bias voltage. The ripple has a wave form similar to the modulation in the optical signals. The inductor 25 is selected so that it suppresses the data (at 200 MHz) but allows the control tone (at 10 kHz) to pass.

If, because of temperature changes for example, the performance of the optical system is altered the output power at facet 22 will change and the amplitude of the equivalent ripple in line 24 will also change. (When the power at facet 22 rises the amplitude in line 24 will increase; when the power falls the amplitude will decrease).

The amplifier 26 responds to the amplitude of the control tone and therefore its signal to multiplier 29 will change. Initially, the device 23 is unaffected as the output of the multiplier 29 will, in the first instance, be affected only by the change in the control tone. Therefore this output will fall when the power at facet 22 falls. Comparitor 30 will detect an imbalance and re-set device 23 so that the drive current in line 24 increases. This increase will produce the following effects:

(1) The gain of amplifier 20 will increase so that the power at facet 22 will increase as required.
(2) The increase in gain applies to the whole signal and the amplitude of the control tone will increase. Hence the output of detector 26 will increase.
(3) The increase in drive current through resistor 28 directly affects the input to difference amplifier 27 so that its output also rises.
(4) Since both its inputs rise the output of multiplier 29 will rise until it equals the value preset in reference 31.

Thus the control loop of the AGC holds the product constant. We have found that this condition holds the optical power output at facet 22 constant within acceptable limits. It is interesting to compare other control strategies.

The conventional control consists only of a constant current device and an inductor to prevent the data affecting it, i.e. items 23 and 25 of FIG. 2. The defect in this strategy is that the characteristics of the system change, e.g. with temperature, and it is necessary to change the drive current to conform to the altered characteristics.

We have also considered a strategy in which device 26 is connected directly to comparitor 30 (and items 27, 28, 29 are eliminated). This strategy gives a better result than a constant drive current but it overcompensates because the effective linkage between the optical system and the drive current depends on the gain. Introducing components 27, 28 and 29 takes the drive current into account and substantially eliminates the over correction.

A submarine cable always includes a plurality of, e.g. six, optical fibres each of which operates independently. Usually the fibres are unidirectional and half the fibres transmit in one direction and the other half transmit in the reverse direction. The cable also comprises tensile strength elements, e.g. longitudinally extending steel wires, a conductor for electric power and a sheath to exclude water. A repeater comprises a strength element to join the strength elements of two cables, an electric power unit connected to the conductors of each cable, the amplifiers which are connected to receive their power from the power unit and a case to exclude water and provide an operational environment for the electrical items. Each repeater includes a plurality of amplifiers, i.e. one for each fibre.

It is possible to use each fibre for two directional, i.e. duplex, operation. If the amplification for each direction is to be separately controlled it is necessary to split the traffic for amplification. Thus there are two amplifiers for each fibre and each amplifier has its own AGC as illustrated in FIG. 2.

As an alternative, each amplifier is used to amplify in both directions. This is desirable because it economises on the number of amplifiers and the power to drive them. This technique contains the inherent restriction that both channels experience the same gain and the design of the system must allow for this restriction. Some preferred requirements for the AGC of a two-directional amplifier will now be given.

It is desirable to allocate control to one channel only. This may be achieved either by providing control tone in one channel only or, preferably, by providing each channel with its own distinctive control tone, i.e. two different frequencies. Each amplifier has its own AGC circuit as shown in FIG. 2 and each AGC is tuned to respond to one control tone and to ignore the other.

In a telecommunications cable with a series of amplifiers it is recommended to tune half the AGC circuits to one control tone and the other half on the AGC circuits to the other control tone. Preferably the control differs at adjacent amplifiers, i.e. the "odd numbered" amplifiers are controlled from one end of the cable and the "even numbered" amplifiers are controlled from the other end.

It will be apparent that this control technique can be extended to systems with more than two channels, e.g. to wavelength division multiplex systems.

Figure 3:
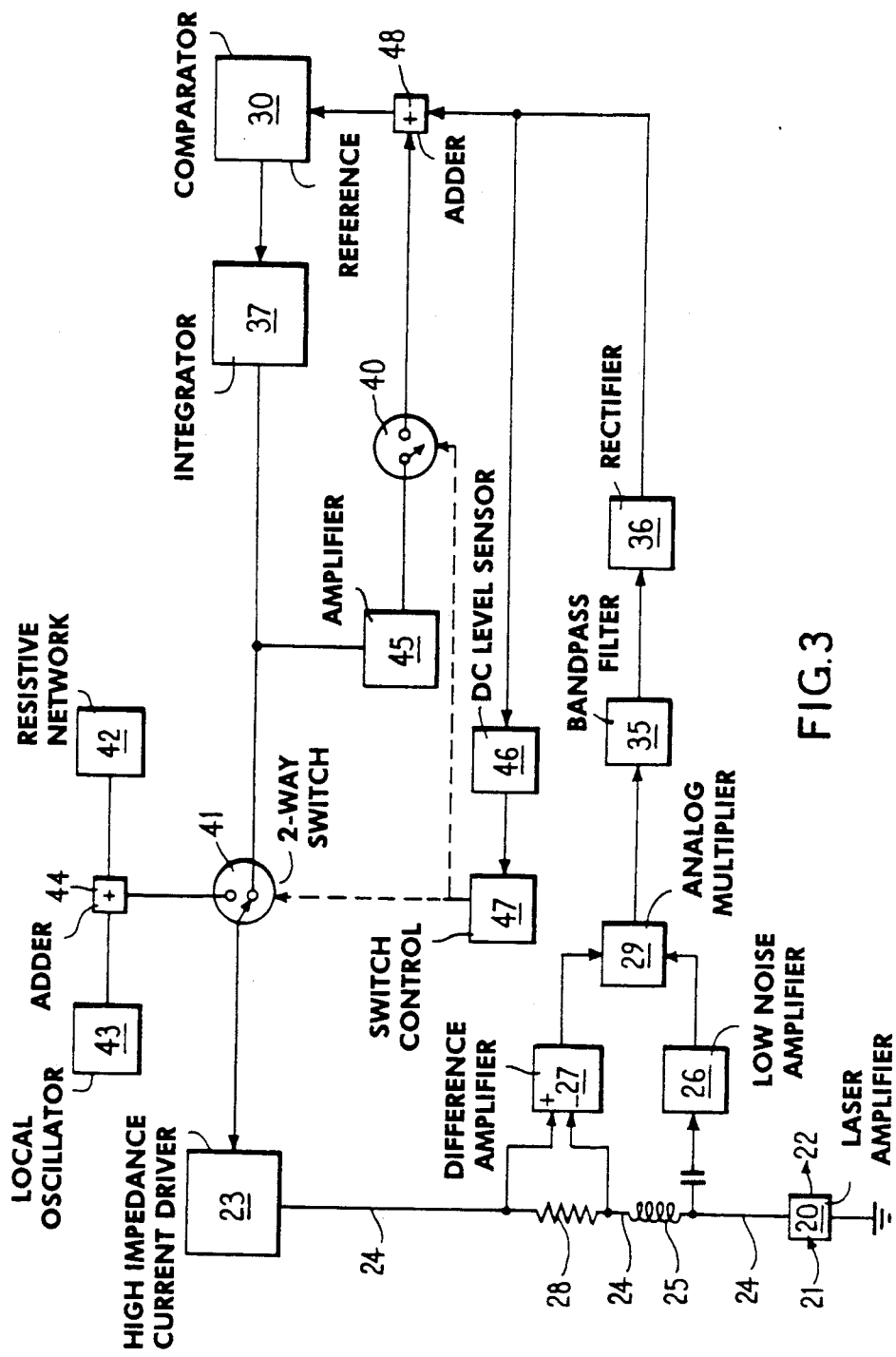
FIG. 3 illustrates a block diagram of another embodiment including a default configuration.

FIG. 3 shows a circuit which includes a normal configuration and a default configuration. The normal configuration corresponds to an AGC circuit substantially as shown in FIG. 2. The distress configuration is adopted when the control tone falls below a threshold level.

Loss of control tone is usually caused by a break in the cable and this prevents normal operation. The default mode is primarily intended for diagnostic tests. In particular the default mode indicates a failure at a particular location or plurality of locations in a long cable. This gives at least an approximate location of a fault.

The circuit shown in FIG. 3 includes four sub-circuits, namely:

(1) Normal configuration

This is slightly modified from the AGC shown in FIG. 2. Elements which perform similar functions have the same numeral.

(2) Selector

This sub-circuit detects the absence of control tone (or a signal proportional to the control tone). It holds the circuit in the normal configuration when the control tone is above a threshold value and it selects the default configuration when the control tone is below the threshold value. The selector includes switches to make the selection.

(3) Distress Caller

This sub-circuit, which is part of the default configuration, enables the optical amplifier 20 to remain functional when there is no control tone and it provides a characteristic frequency to identify itself.

(4) Overload Guard

This sub-circuit, which is also part of the default configuration, guards against unstable or overloaded operation when there is no control tone. It is desirable to protect against overload when starting operation (for the first time or after a break) or when operating in default mode for diagnostic purposes.

The four sub-circuits will now be described separately.

Item (1) above, i.e. the AGC, is shown in slightly more detail than in FIG. 2. The extra elements are a band pass filter 35 to separate control tone from other frequencies and a rectifier 36 to provide a DC signal to comparitor 30. The output of the comparitor 30 is connected to an integrator 37. In the normal configuration the output of the integrator 37 is connected to the control port of device 23 via two-way switch 41.

Item (2) above, i.e. the selector, comprises a DC level sensor 46 which monitors the output of rectifier 36 and a control device 47 to actuate switches 40 and 41.

Item (3) comprises a resistive network 42 which produces a DC bias to substitute for the control signal whenever the AGC is rendered inoperative by the absence of control tone. The distress caller also includes a local oscillator 43 to provide a distress tone characteristic of its own repeater, i.e. the distress tone is different at every repeater in the system. Oscillator 43 and resistive network 42 are connected to an adder 44 which combines the two signals. The combined signal passes to switch 41 which, in the default configuration, disconnects the AGC from device 23 and connects the adder 44 to device 23.

In the default configuration, i.e. in the absence of control tone, the amplifier 26 and therefore the multiplier 29, will have zero input. The comparitor 30 will thus receive a zero input and in consequence it will produce a very high output in an attempt to achieve an impossible balance. The overload could be enough to damage itself and subsequent elements, i.e. the integrator 37. In the default configuration, the amplifier 45 feeds back signal from the output of the integrator 37 to the input of the comparitor 30 with a gain of, for example, 45 dB. This provides a realistic input signal to the comparitor 30 so that the loop 30-37-45-40-48 stabilises at a safe power. (The adder 48 prevents detection of the loop signal by sensor 46).

In the normal configuration, the detector 46 actuates control unit 47 to disconnect the distress caller (42, 43, 44) and the overload guard sub-circuit (45, 40). The AGC operates as described above. The operation in the default mode will now be described.

The most usual accident is a broken cable. This clearly prevents all communication across the break. It is convenient to call the direction from land to the break "outward" and from the break to land "inward". Clearly there are two segments of cable, each with its own inward and outward direction.

Electrical power to the amplifiers is provided via an electric conductor included in the optical cable. Even though the cable is broken it is still possible to provide an electrical supply. The sea is utilised as a return conductor but the broken end does not constitute a short circuit because the length and electrical resistance of even the broken segment will be substantial. Thus it is possible to retain the electrical power whereby the amplifier can still function.

The cable is designed for two-directional communication and each segment will include both inward and outward telecommunications channels. Clearly the outward channels are useless even for diagnostics. The default mode operation of one inward channel will now be explained.

The amplifier nearest the break will be designated "first" and its operation will be explained first. Even with the cable broken there is electric power and the amplifier 20 receives a drive current via line 24 but there are no optical signals received at the input facet 21 because of the break. Under these conditions the amplifier will act as an LED so there is an optical signal at the output facet 22. The mean power of the signal is set by the control from the network 42, the conditions may not be optimal but they are at least useful. The local oscillator imposes its own characteristic distress ripple onto the drive current in line 24 and the optical output of the amplifier 22 is thereby amplitude modulated at this characteristic distress frequency.

The modulated LED signal is passed along a fibre to the next amplifier. There is no control tone so it takes the default configuration. It is still operational so that it amplifies its received signal and imposes its own characteristic distress frequency from its own local oscillator. Thus the optical signal produced at the output facet 22 of the second amplifier is modulated with two distress frequencies.

The optical signal passes from amplifier to amplifier whereby, when it reaches land, it is modulated with the distress frequency of every amplifier in the chain. At the land station the optical signal is demodulated to an electrical signal with a complex wave form. This signal is fed to a frequency analyser which identifies the distress frequencies present. The presence of a particular distress frequency indicates that its amplifier is not only operative in the distress mode but also that it is connected to shore and hence the length of the broken segment can be deduced. Most cables comprise a plurality of inward channels and the diagnostic tests described can be repeated for each channel. This gives a plurality of results which, ideally, confirm one another.

In addition the diagnostic tests can be performed on both segments of the cable. This may enable receipt of a distress frequency from every repeater, some at one end of the cable and the remainder at the other. This gives a very clear indication of the location of the break. If one segment were very long it might not be possible to provide electrical power to the outer end without overloading the inner end. In this case the other segment would be short and it would be possible to conduct the diagnostic tests but on the shorter length only.

The overload guard sub-circuit not only protects the comparitor 30 and integrator 37 during default mode operation for diagnostic tests as described above but it also provides a desirable safeguard during the (transient) period when the cable is switched on. This applies at the very first switching on and whenever the cable is switched on after a break in operation, e.g. after an accident.

Consider the circuit shown in FIG. 2. Under electric power and in the absence of optical signal, the comparitor 30 risks an overload. As shown in FIG. 3, the default configuration is adopted and this includes protection against overload.

If an optical signal, with control tone, is provided to the input facet of FIG. 2, then, in the absence of electric power, there is no amplification and the circuit is dead. If power is switched on with signal present there is no amplification until a suitable drive current is established in line 24. Furthermore, there will be no adequate signals to the amplifiers 26 and 27 until this adequate current is established in line 24.

Hence there is a transient period during which the comparitor 30 and hence device 23 are without proper control signals. This is an unstable condition with a potential to overload. The modification shown in FIG. 3 protects against this condition. When, because normal conditions have not yet been attained, there is a low control signal, the level sensor 46 actuates control unit 47 to keep the circuit in the default configuration. Thus constant current device 23 has an adequate control signal from network 42 while comparitor 30 and integrator 37 are protected by amplifier 45. These are stable and safe conditions for optical amplifier 20 to establish its function. Level detector 46 reacts when the control signal from rectifier 36 becomes adequate and it actuates control unit 47 to invert switches 41 and 48. This converts the circuit from its default configuration into its normal configuration wherein it operates as an AGC. This is valuable protection during start up.

It should be noted that level sensor 46 is actuated by control tone (if present) in both the normal and default configurations. Thus the circuit switches to default configuration when control tone drops below the threshold value and it reverts to normal configuration when the control tone comes back to values above the threshold.

In normal operation the control tone is substantially constant after amplification. In default it is zero (or only noise). Therefore the precise setting of the threshold value is not important. Settings in the range 25% to 75% of the normal value are suitable.

What we claim is:

1. An optical communications system which comprises optical amplifying means connected to receive optical signals from a signal generator, which generator is adapted to modulate an optical control tone onto the optical signals, wherein said amplifying means comprises a laser amplifier and drive means for providing a drive current to said laser amplifier, wherein said laser amplifier is adapted to amplify said optical signals and to superimpose an electrical control tone equivalent to received optical control tone onto the drive current, and wherein the optical amplifying means also comprises an automatic gain control circuit responsive to the electrical control tone and adapted to vary the drive current so as to reduce the variation in the output power of the laser amplifier.

2. Amplifying means for optical signals modulated with an optical control tone, wherein said amplifying means comprises:
   (a) a laser amplifier for amplifying said optical signals;
   (b) drive means for supplying drive current to the laser amplifier;
   (c) a drive circuit connecting the drive means to the laser amplifier;

(d) AGC means connected to receive input from the drive circuit and having an output connected to control the drive current;

wherein the laser amplifier is adapted to superimpose an electrical control tone onto signals in the drive circuit, said electrical control tone being derived from received optical control tone, and said AGC means is adapted to produce a parameter signal from said electrical control tone and to vary the drive current so as to keep the control parameter at a pre-set level.

3. Amplifying means according to claim 2, wherein the output of the AGC means is connected to the drive means.

4. Amplifying means according to claim 2 or claim 3, wherein the AGC means comprises a first detector responsive to the electrical control tone, a second detector responsive to the drive current, and a multiplier connected to said first and second detectors whereby the parameter signal is the product of the two inputs of the multiplier.

5. Amplifying means according to claim 4, wherein the first detector is an amplifier connected to receive electrical control tone via a capacitor.

6. Amplifying means according to claim 4, wherein the second detector is an amplifier connected in parallel with a resistor located in the drive circuit.

7. Amplifying means according to claim 4, wherein the output of the multiplier is connected to a band pass filter for the control tone, a rectifier and a difference amplifier, whereby said difference amplifier is adapted to produce an error signal by comparing the output of the rectifier with a reference value.

8. Amplifying means for optical signals modulated with a control zone, which amplifier comprises:
  (i) a normal configuration;
  (ii) a default configuration; and
  (iii) selector means operative to select between configurations (i) and (ii);

wherein configuration (i) comprises:
  (a) a laser amplifier for amplifying said optical signals;
  (b) drive means for supplying drive current to the laser amplifier;
  (c) a drive circuit connecting the drive means to the laser amplifier;
  (d) AGC means connected to receive input from the drive circuit and having an output connected to control the drive current;

wherein the laser amplifier is adapted to superimpose an electrical control tone onto signals in the drive circuit, said electrical control tone being derived from received optical control tone, and said AGC means is adapted to produce a parameter signal from said electrical control tone and to vary the drive current so as to keep the control parameter at a pre-set level; configuration (ii) comprises alternate means for providing drive current to said laser amplifier and the selector means includes a detector responsive to a level of control tone below a threshold level and switching means operatively linked to said detector means, said switching means being adapted to connect the normal configuration when the detected level is above the threshold and to connect the default configuration when the detected level is below the threshold.

9. Amplifying means according to claim 8, wherein the alternate means is adpated to provide an alternate control signal to said drive means and a switching means is adapted to connect the AGC means to the drive means in the normal configuration and the alternate means to the drive means in the default configuration.

10. Amplifying means according to either claim 8, wherein the alternate means is adapted to provide a DC bias with a ripple at a characteristic distress frequency, whereby the optical output contains an indication that the amplifier has adopted the default configuration.

* * * * *